J. N. DUNCAN.
SHIPPING SUPPORT FOR AUTOMOBILES.
APPLICATION FILED MAY 2, 1919.

1,388,244.

Patented Aug. 23, 1921.
3 SHEETS—SHEET 1.

INVENTOR
James N. Duncan,
BY Emerson R. Newell
ATTORNEY

J. N. DUNCAN.
SHIPPING SUPPORT FOR AUTOMOBILES.
APPLICATION FILED MAY 2, 1919.

1,388,244.

Patented Aug. 23, 1921.

INVENTOR
James N. Duncan
BY
ATTORNEY

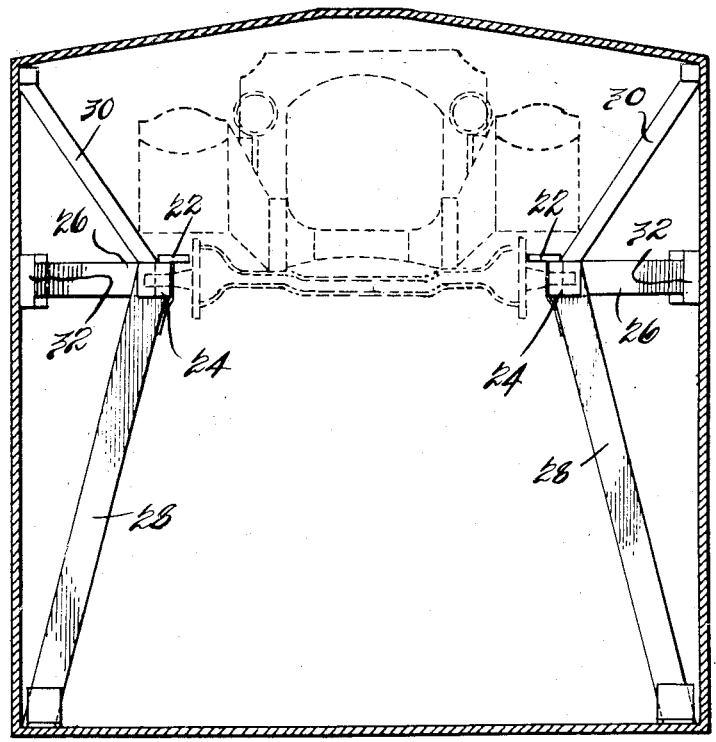
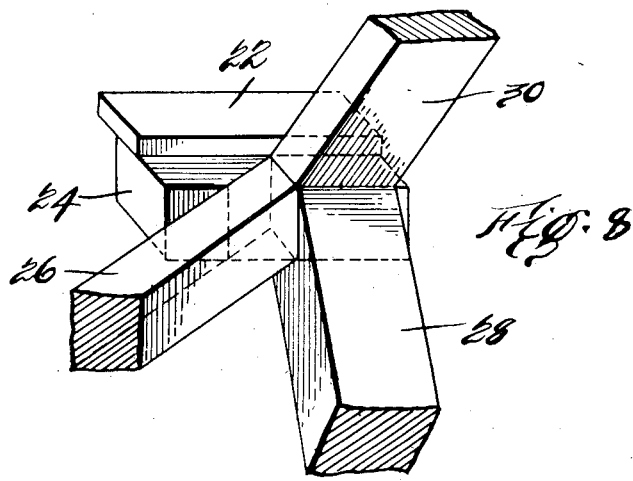

UNITED STATES PATENT OFFICE.

JAMES N. DUNCAN, OF DETROIT, MICHIGAN.

SHIPPING-SUPPORT FOR AUTOMOBILES.

1,388,244.   Specification of Letters Patent.   Patented Aug. 23, 1921.

Application filed May 2, 1919. Serial No. 294,140.

*To all whom it may concern:*

Be it known that I, JAMES N. DUNCAN, a citizen of the United States, residing at Detroit, Michigan, have invented certain new and useful Improvements in Shipping-Supports for Automobiles, of which the following is a clear, full, and exact description.

This invention relates to improvements in the construction of supporting frame work, particularly for use in supporting automobiles in freight cars for shipment, and an object of the invention is to provide a structure which will adequately support and prevent any injurious movement of the automobiles during shipment and which at the same time requires but few pieces of timber in the making thereof.

In order to utilize all of the available space in freight cars, it is desirable that some of the automobiles packed therein be supported adjacent the roof of the car so that the lower space of the car may be utilized either for other automobiles or for other articles, and my improved structure is particularly adapted for supporting an automobile adjacent the roof of a freight car. Owing to the novel method of construction, comparatively few pieces of timber are used.

Other objects and advantages of the invention will be apparent from the following description and claims, when taken in connection with the accompanying drawings, in which—

Fig. 7 is an elevational view looking toward the left from about the position of the arrow B, Fig. 1; and Fig. 8 is a perspective detail of a portion of the supporting frame work for the front axle of an automobile.

Figure 2:
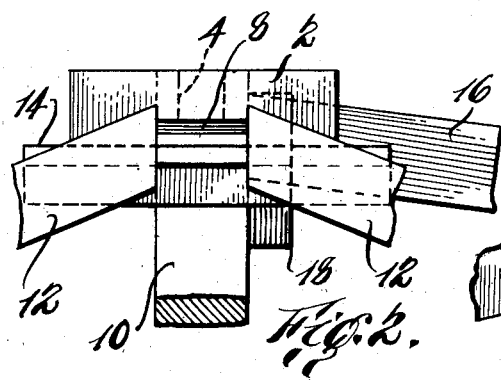
Fig. 2 is a top plan view of the lower left hand supporting members of Fig. 1 on an enlarged scale.
Figure 4:
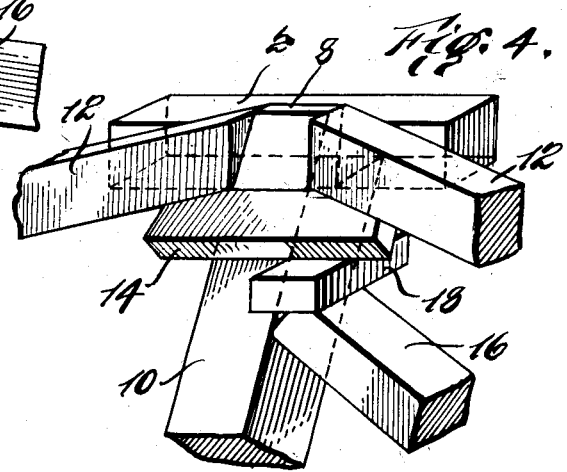
Fig. 4 is a perspective view of the same structure.
Figure 3:
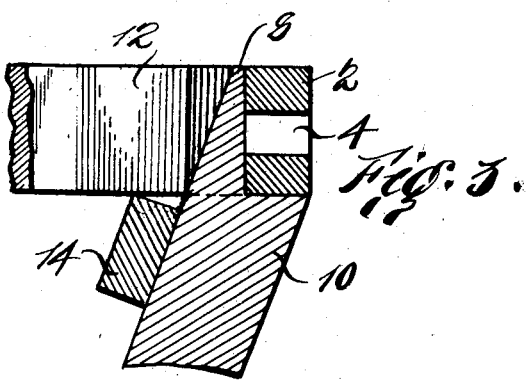
Fig. 3 is a sectional view of the portion of the structure shown in Fig. 2.
Figure 5:
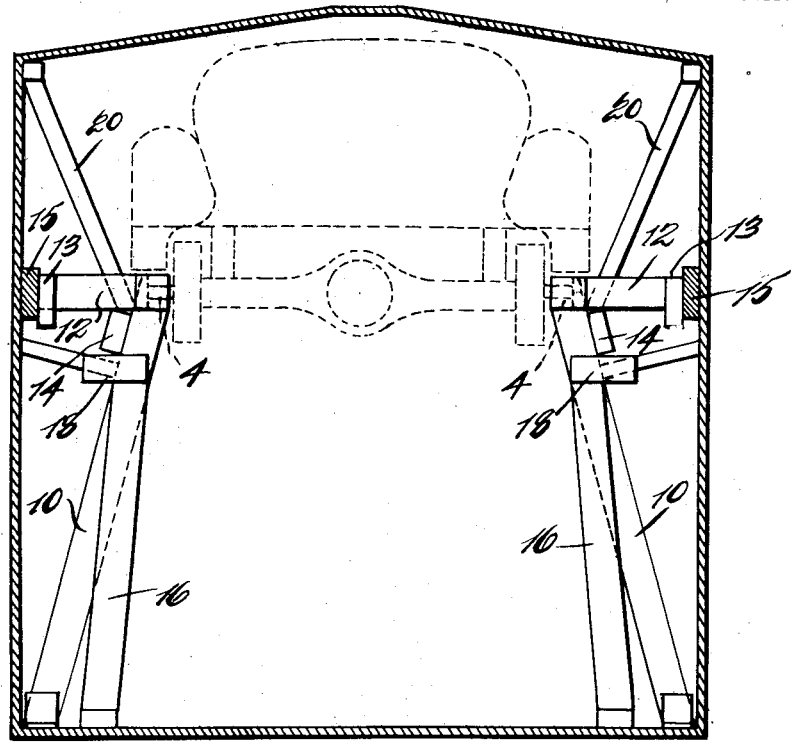
Fig. 5 is an elevational view of the supporting frame work, looking toward the left hand end of the car from about the position of the arrow A, Fig. 1.
Figure 6:
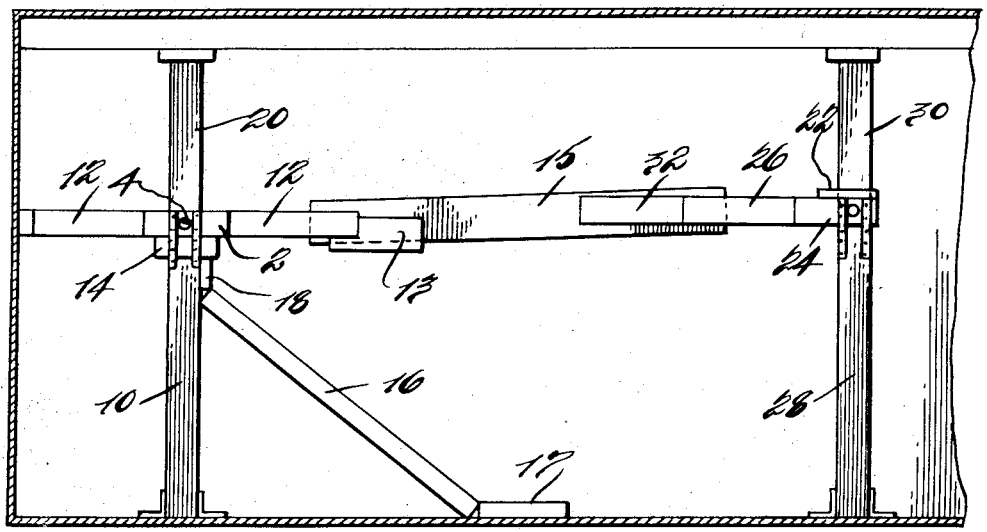
Fig. 6 is a side elevational view thereof.

Referring to the drawings, blocks 2 support the ends of the rear axle 4 of the automobile, said blocks being spaced a sufficient distance apart to properly accommodate the rear axle between them. For carrying the load of the car, diagonal braces 10 are provided, there being a brace 10 for each end of the rear axle, as shown in Fig. 5, each brace supporting a block. Each of the blocks 2 is recessed, as shown in Figs. 2, 3 and 4, to engage a projecting tongue 8 formed on the diagonal brace 10. The lower end of each brace 10 may be secured by angles, as shown in Fig. 6, or in any suitable way.

Figure 1:
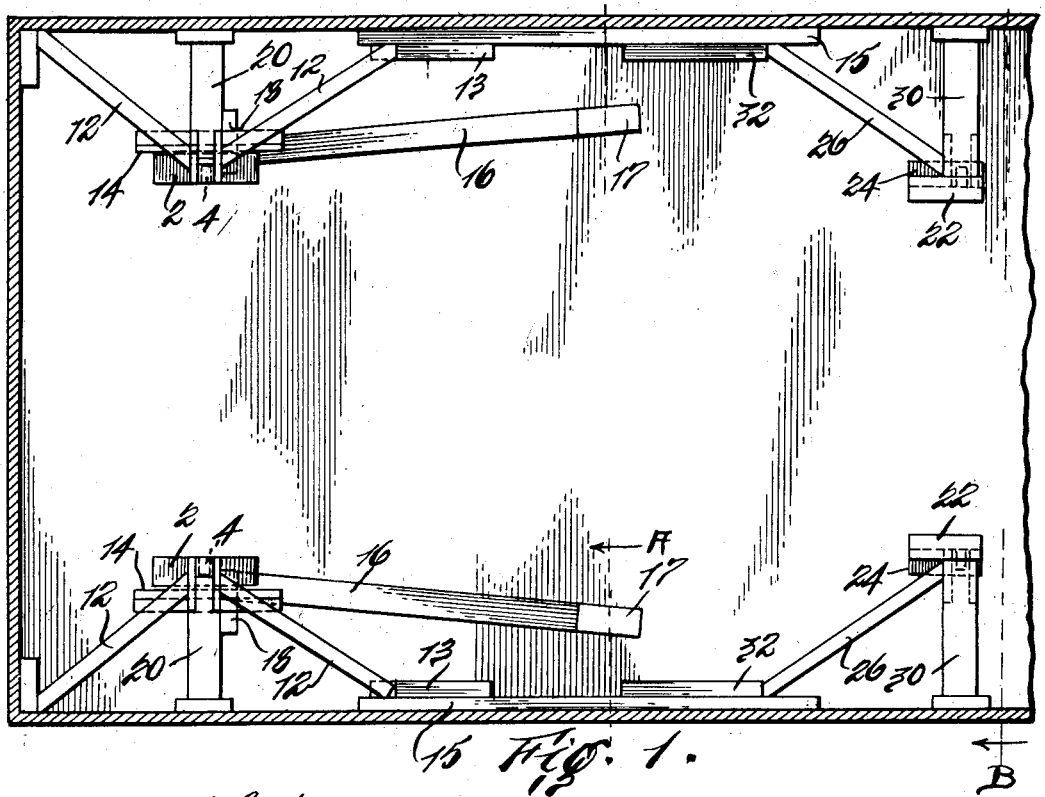
Figure 1 is a top plan view of the structure employed for supporting an automobile, the sides and one end of the freight car being shown in section.

In order to prevent the blocks 2 from shifting longitudinally of the car, horizontal bracing members 12 are provided, these members having ends sawed at an angle so as to properly bear against the sides of the tongue 8, as shown in Fig. 4, and fitting into recesses formed in the block 2. The other ends of the braces 12 bearing against blocks such as 13, shown in Fig. 1.

To prevent movement of the blocks 2 upwardly, braces 20 are provided, said braces extending from the upper portion of the car, each in the same vertical plane as the braces 10, their lower ends bearing against a block 14 secured to the diagonal brace 10. This block 14 in addition to acting as a bearing for the brace 20, also fulfils an additional function and to this end each block 14 passes under each of the horizontal braces 12 and prevents them from slipping downwardly. The ends of the braces 12 therefore need not be secured to the block 2. In order to further prevent any danger of longitudinal movement of the automobile on its support, diagonal braces 16 may be provided, which at their upper ends engage a block 18 secured to the diagonal brace 10 just beneath the block 14, the other end of each of the diagonal braces 16 abutting against a block 17 in the floor of the car.

The above description applies to the supporting structure for the rear axle of the automobile. For supporting the front axle, a somewhat similar structure is provided, although experience has indicated that the same extent of bracing is not necessary for the front axle of the car as for the rear axle thereof, and consequently I have modified the supporting structure for the front axle accordingly. The supporting structure for the front axle comprises blocks 24 having holes therein into which the front axle extends, these blocks corresponding in form and function to the blocks 2 already described. In order to prevent longitudinal shifting of the automobile axle within the blocks 24, projecting blocks 22 are provided which are secured each to a block 24, said blocks 22 projecting toward the center of the car and into contact with the steering knuckle and axle yoke. Diagonal braces 28, similar in shape to the braces 10, carry the weight of the front axle. Horizontal braces 26 corresponding to the braces 12, are also provided, these braces engaging the sides of the diagonal brace 28, but only one brace 26 is needed for each axle end as the rear braces 12 are mainly relied upon to prevent longitudinal shifting of the automobile within the car. Braces 26 extend to the rear and abut against blocks 32 fastened to the side walls of the retaining structure. To prevent any movement of the blocks 24 upwardly, braces 30 are provided which extend to the top side walls of the car.

With the above described structure employing but few pieces of timber, it has been found that ample rigidity is secured and notwithstanding the knocks and jars to which automobiles are subjected in freight cars, thousands have been shipped by this means without a single case of damage occurring.

Having thus described my invention, what I claim as new and desire to secure by Letters Patent is:—

1. In a structure of the character described, the combination with the walls of a retaining inclosure, of supporting means for a vehicle, said supporting means having bracing members running from the points of vehicle support toward the upper and lower walls of the inclosure, and bracing members running from adjacent some of said points of vehicle support in planes at right angles to the plane in which said first mentioned members are located.

2. In a structure of the character described, the combination with the walls of a retaining inclosure, of supporting means for a vehicle, said supporting means forming trusses with the side walls of the inclosure, the members of the trusses forming two groups situated in planes at right angles to each other.

3. In a structure of the class described, the combination with the side walls of a supporting structure, of a supporting block for each end of the rear axle of the vehicle to be supported, a diagonal brace supporting each block in horizontal position, a recess in each block into which said brace is fitted, a pair of diagonal braces arranged in a horizontal plane also fitting into said recess and engaging on either side of said diagonal brace to thereby prevent longitudinal movement of said block.

4. In a structure of the character described, the combination with a series of blocks for supporting the axles of a vehicle, a pair of braces extending in a horizontal plane and a pair of braces extending in a vertical plane supporting each end of one of said axles, a pair of braces extending in a vertical plane and a single brace extending in a horizontal plane for supporting each end of the other of said axles.

5. In a structure of the character described, the combination with the walls of a retaining inclosure, of a supporting block for each end of one of the axles of the vehicle to be supported, a diagonal brace supporting each block and a pair of braces arranged in a horizontal plane, one engaging either side of said diagonal brace to hold said block from longitudinal movement, and means secured to each of said diagonal braces for preventing downward movement of the horizontal braces associated therewith.

6. In a structure of the character described, the combination with the walls of a retaining inclosure, of a supporting block for each end of the axles of the vehicle to be spported, a diagonal brace supporting each block and a pair of braces arranged in a horizontal plane, one engaging either side of said diagonal brace to hold said block from longitudinal movement, and a block secured to each of said diagonal braces and extending under each pair of horizontal braces to prevent the downward movement thereof.

7. In a structure of the character described, the combination with the walls of a retaining inclosure, of a supporting block for each end of the axles of the vehicle to be supported, a diagonal brace supporting each block, a pair of braces arranged in a horizontal plane, one engaging either side of said diagonal brace to hold said block from longitudinal movement, a block secured to each of said diagonal braces and extending under each pair of horizontal braces to prevent downward movement thereof, a second block also secured to said diagonal brace and engaging said second mentioned block, and a diagonal brace extending at an angle to said first mentioned diagonal brace for aiding said horizontal braces in preventing longitudinal movement of said first mentioned block.

8. In a structure of the characted described, the combination with the walls of a retaining inclosure, of supporting means for a vehicle, said supporting means including blocks into which the ends of one of the axles of the vehicle extend, bracing members for said blocks, a pair for each block, said members running from each block toward the upper and lower walls of the inclosure, horizontal bracing members engaging said blocks, a pair for each block and running from said blocks in a plane at right angles to the plane of said first mentioned bracing members, and means for preventing downward movement of said horizontal bracing members, said means comprising a second block, one block for each pair of bracing members engaging under said members, said second blocks also furnishing a supporting means for the bracing members running to the upper walls of the inclosure.

Signed at Detroit, Michigan, this 24th day of April, 1919.

JAS. N. DUNCAN.

Witnesses:
    JOHN R. FURSE,
    ALFRED H. KNIGHT.